United States Patent
Jung et al.

(10) Patent No.: US 8,317,146 B2
(45) Date of Patent: Nov. 27, 2012

(54) SUPPORTING DEVICE AND DUAL DISPLAY UNIT HAVING THE SAME

(75) Inventors: Jun Su Jung, Suwon-si (KR); Jeong Roh Lee, Suwon-si (KR); Jin Sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 12/209,532

(22) Filed: Sep. 12, 2008

(65) Prior Publication Data

US 2009/0090825 A1 Apr. 9, 2009

(30) Foreign Application Priority Data

Oct. 5, 2007 (KR) .......................... 10-2007-0100113
Jan. 4, 2008 (KR) .......................... 10-2008-0001492

(51) Int. Cl.
*E04G 3/00* (2006.01)
*H05K 5/00* (2006.01)

(52) U.S. Cl. ............... 248/286.1; 248/125.7; 248/298.1; 361/679.04

(58) Field of Classification Search ............... 248/122.1, 248/127, 125.7, 125.9, 223.41, 917–919, 248/124.1, 222.52, 441.1, 458, 284.1, 286.1, 248/291.1, 298; 361/679.04–679.06, 679.21, 361/679.27, 680–681
See application file for complete search history.

(56) References Cited

U.S. PATENT DOCUMENTS

| | | | | |
|---|---|---|---|---|
| 5,687,939 A * | 11/1997 | Moscovitch | ............... | 248/122.1 |
| 6,222,507 B1 * | 4/2001 | Gouko | ..................... | 361/679.04 |
| 7,061,754 B2 * | 6/2006 | Moscovitch | ............. | 361/679.21 |
| 7,092,247 B2 * | 8/2006 | Kim | ......................... | 361/679.04 |
| 7,237,202 B2 * | 6/2007 | Gage | .............................. | 715/761 |
| 7,283,353 B1 * | 10/2007 | Jordan et al. | ............. | 361/679.27 |
| 7,633,744 B2 * | 12/2009 | Kuhn | ....................... | 361/679.04 |
| 7,823,856 B2 * | 11/2010 | Schwartz et al. | .......... | 248/442.2 |
| 2003/0095373 A1 * | 5/2003 | Duquette | ....................... | 361/681 |
| 2004/0195471 A1 * | 10/2004 | Sachen, Jr. | ..................... | 248/127 |
| 2005/0207104 A1 | 9/2005 | Love | | |
| 2006/0082518 A1 | 4/2006 | Ram | | |
| 2007/0084978 A1 | 4/2007 | Martin et al. | | |
| 2007/0205340 A1 * | 9/2007 | Jung | .......................... | 248/125.9 |

(Continued)

FOREIGN PATENT DOCUMENTS

KR 2006-134558 12/2006

OTHER PUBLICATIONS

Chinese Office Action issued Aug. 12, 2010 in CN Application No. 200810215214.5.

(Continued)

*Primary Examiner* — Tan Le
(74) *Attorney, Agent, or Firm* — Stanzione & Kim, LLP

(57) ABSTRACT

A supporting device is installed between an auxiliary display unit and a main display unit to variously change the position and pose of the auxiliary display unit and a dual display unit having the same are disclosed. The dual display unit includes a main display unit which displays an image, a supporting device which is coupled to the main display unit, and an auxiliary display unit which is installed on the supporting device. The supporting device is configured to adjust the distance between the main display unit and the auxiliary display unit.

17 Claims, 9 Drawing Sheets

U.S. PATENT DOCUMENTS

| | | | |
|---|---|---|---|
| 2008/0117578 A1* | 5/2008 | Moscovitch | 361/681 |
| 2008/0225472 A1* | 9/2008 | Chih | 361/681 |
| 2008/0316689 A1* | 12/2008 | Moscovitch | 361/680 |
| 2009/0090825 A1* | 4/2009 | Jung et al. | 248/205.1 |
| 2009/0091512 A1* | 4/2009 | Jung et al. | 345/1.1 |

OTHER PUBLICATIONS

European Search Report issued Apr. 20, 2011 in EP Application No. 08165394.1.

* cited by examiner

SUPPORTING DEVICE AND DUAL DISPLAY UNIT HAVING THE SAME

CROSS-REFERENCE TO RELATED APPLICATIONS

This application claims priority under 35 U.S.C. §119(a) from Korean Patent Application Nos. 2007-0100113, filed on Oct. 5, 2007, and 2008-1492, filed on Jan. 4, 2008, in their entirety in the Korean Intellectual Property Office, the disclosures of which are incorporated herein by reference.

BACKGROUND OF THE INVENTION

1. Field of the Invention

The present general inventive concept relates to a supporting device and a dual display unit having the same, and, more particularly, to a supporting device which is installed between an auxiliary display unit and a main display unit to variously change the position and pose of the auxiliary display unit and a dual display unit having the same.

2. Description of the Related Art

As multitasking using the computer becomes common, a dual display unit is increasingly desirable to provide various screens to the user through an additional display unit in addition to a basic display unit.

Korean Patent Laid-open Publication No. 10-2006-134558 discloses an example of one dual display unit design. In this dual display unit, a receiving space is formed on the rear surface of a main liquid crystal display and a liquid crystal moving unit is installed in the receiving space to guide the movement of an auxiliary liquid crystal display. Accordingly, the auxiliary liquid crystal display is received in the receiving space and is movable to an upper portion or a side portion of the main liquid crystal display from the receiving space by the liquid crystal moving unit when the auxiliary liquid crystal display is used.

However, the conventional dual display unit has the following problems.

In the conventional dual display unit, the auxiliary display unit and the main display unit are formed as a single body, and the auxiliary display unit slides to the upper portion or side portion of the main display unit. Accordingly, the position and pose of the auxiliary display unit are very limited. Further, there is a problem that the auxiliary display unit cannot be added to the existing display unit.

Further, since the receiving space which receives the auxiliary display unit and the moving unit which slides and moves the auxiliary display unit to change the position of the auxiliary display unit are provided on the rear surface of the main display unit, there is a problem of increasing a total thickness of the product.

SUMMARY OF THE INVENTION

The present general inventive concept provides a supporting device capable of changing the position and pose of an auxiliary display unit relative to a main display unit. The present general inventive concept also provides a dual display unit having two display units connected by the supporting device so that many different viewing configurations are possible.

Additional aspects and/or advantages of the present general inventive concept will be set forth in part in the description which follows and, in part, will be obvious from the description, or may be learned by practice of the general inventive concept.

Another aspect of the general inventive concept provides a supporting device which enables the auxiliary display unit to be added to an existing display unit without causing an increase in the thickness of the profile of the main display unit, and a dual display unit having the same functionality.

The foregoing and/or other aspects and utilities of the present general inventive concept may also be achieved by providing a dual display unit including a main display unit which displays an image, a supporting device which is coupled to the main display unit, and an auxiliary display unit which is installed on the supporting device wherein the supporting device is configured to adjust a distance between the main display unit and the auxiliary display unit.

The supporting device can be rotatably installed such that the auxiliary display unit moves to an upper side or opposite side of the main display unit.

The supporting device can be rotatably coupled to the auxiliary display unit such that the auxiliary display unit is capable of being arranged in a landscape view or a portrait view.

The supporting device can include a first supporting member installed on the main display unit and a second supporting member installed on the auxiliary display unit, and the first supporting member and the second supporting member are slidably coupled to each other to adjust the distance between the main display unit and the auxiliary display unit.

The first supporting member can include a guide rail to guide a sliding motion of the second supporting member.

A guide member can be installed on an inside of the guide rail to guide the sliding motion of the second supporting member.

At least one fixing protrusion can be disposed on any one of the inside of the guide rail, the guide member or a fixing groove coupled to the fixing protrusion, is disposed on the other side thereof to fix a position of the guide member.

The first supporting member can include a position determining groove to guide a sliding position of the second supporting member, and a stopper having a position determining protrusion, which is engaged with the position determining groove, is installed on the second supporting member.

The second supporting member can include a hinge portion such that the auxiliary display unit is tilted forward and backward.

An installation hole compliant with a VESA standard can be disposed on a rear surface of the main display unit, and the supporting device can be installed through the installation hole.

The supporting device can further include an installation bracket having a shaft hole to support the supporting device to rotate with respect to the main display unit.

The installation bracket can include first rotation limiting projections formed at opposite sides of the shaft hole, and the supporting device includes a second rotation limiting projection which is in contact with the first rotation limiting projections to restrict a rotation range of the supporting device.

The supporting device can include a supporting member which connects between the main display unit and auxiliary display unit, and a slide unit which is installed on the main display unit or the auxiliary display unit and guides forward and backward movement of the supporting member to adjust the distance between the main display unit and auxiliary display unit.

The slide unit can be rotatably coupled to main display unit or the auxiliary display unit.

The supporting member can be rotatably coupled to main display unit or the auxiliary display unit.

The slide unit can include a guide roller to guide the forward and backward movement of the supporting member.

A rack can be disposed on the supporting member in a longitudinal direction, and the slide unit includes a pinion which rotates while being engaged with the rack.

A supporting member can include a guide groove formed in a longitudinal direction, and the slide unit includes a slide protrusion which is coupled to the guide groove to restrict a moving range of the supporting member.

The main display unit can include at least one first rotation limiting projection formed on its rear surface, and the supporting device includes a second rotation limiting projection which is in contact with the first rotation limiting projection to restrict a rotation range of the supporting device.

The foregoing and/or other aspects and utilities of the present general inventive concept may also be achieved by providing a supporting device which is installed between a main display unit and an auxiliary display unit to adjust a distance between the main display unit and the auxiliary display unit, and is rotatably installed on a rear surface of the main display unit such that the auxiliary display unit moves to an upper side or opposite sides of the main display unit.

The supporting device can be rotatably coupled to auxiliary display unit such that the auxiliary display unit is arranged in a landscape view and a portrait view.

The supporting device can include a first supporting member installed on the main display unit and a second supporting member installed on the auxiliary display unit, and the first supporting member and the second supporting member are slidably coupled to each other to adjust the distance between the main display unit and the auxiliary display unit.

The first supporting member can include a guide rail to guide a sliding motion of the second supporting member.

A guide member can be installed on the inside of the guide rail to guide the sliding motion of the second supporting member.

The first supporting member can include a position determining groove to guide a sliding position of the second supporting member, and a stopper having a position determining protrusion, which is engaged with the position determining groove, is installed on the second supporting member.

The second supporting member can include a hinge portion such that the auxiliary display unit is tilted forward and backward.

An installation hole compliant with a VESA standard can be disposed on a rear surface of the main display unit, and the supporting device is installed through the installation hole.

The supporting device can further include an installation bracket having a shaft hole to support the supporting device to rotate with respect to the main display unit.

The auxiliary display unit can be positioned at the vertical opposite sides or the upper side of the main display unit, and can have various positions, angles and poses through a rotation operation, a tilting operation or the like.

Further, even if the auxiliary display unit is added to the dual display unit, the entire thickness of the product hardly increases. The dual display unit can be easily embodied by newly adding the supporting device and the auxiliary display unit to an existing display unit.

The foregoing and/or other aspects and utilities of the present general inventive concept may also be achieved by providing a dual display unit including a first display unit, a second display unit, a supporting device coupled to the first display unit and the second display unit, the supporting device being capable of providing a range of motion to reposition at least one of the display units, such that the viewing configuration is changed as either the first display unit or the second display unit is repositioned along the range of motion of the supporting device.

The foregoing and/or other aspects and utilities of the present general inventive concept may also be achieved by providing a supporting device capable of connecting a first display unit and a second display unit, the supporting device including a support member presenting a longitudinal length and axis and having a first end and a second end, each end disposed opposite the other along the length of the support member, first coupling structure suitable to couple with the first display unit and disposed proximal the first end of the support member, second coupling structure suitable to couple with the second display unit and disposed proximal the second end of the support member; and repositioning structure to reposition at least one display unit and disposed on the support member, such that when the first display unit is coupled with the first coupling structure and the second display unit is coupled with the second coupling structure, at least one of the first display unit or the second display unit can be repositioned.

The foregoing and/or other aspects and utilities of the present general inventive concept may also be achieved by providing a supporting device capable of connecting a first display unit and a second display unit, the supporting device including a first support member, a second support member coupled to the first support member, the first support member and second support member presenting a longitudinal collective length and axis and having a first end and a second end, each end disposed opposite the other along the collective length of the support member, a first coupling structure suitable to couple with the first display unit and disposed proximal the first end, a second coupling structure suitable to couple with the second display unit and disposed proximal the second end of the support member and repositioning structure to reposition at least one display unit and disposed along the collective length of the first support member and the second support member, such that when the first display unit is coupled with the first coupling structure and the second display unit is coupled with the second coupling structure, at least one of the first display unit or the second display unit can be repositioned.

BRIEF DESCRIPTION OF THE DRAWINGS

These and/or other aspects and advantages of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
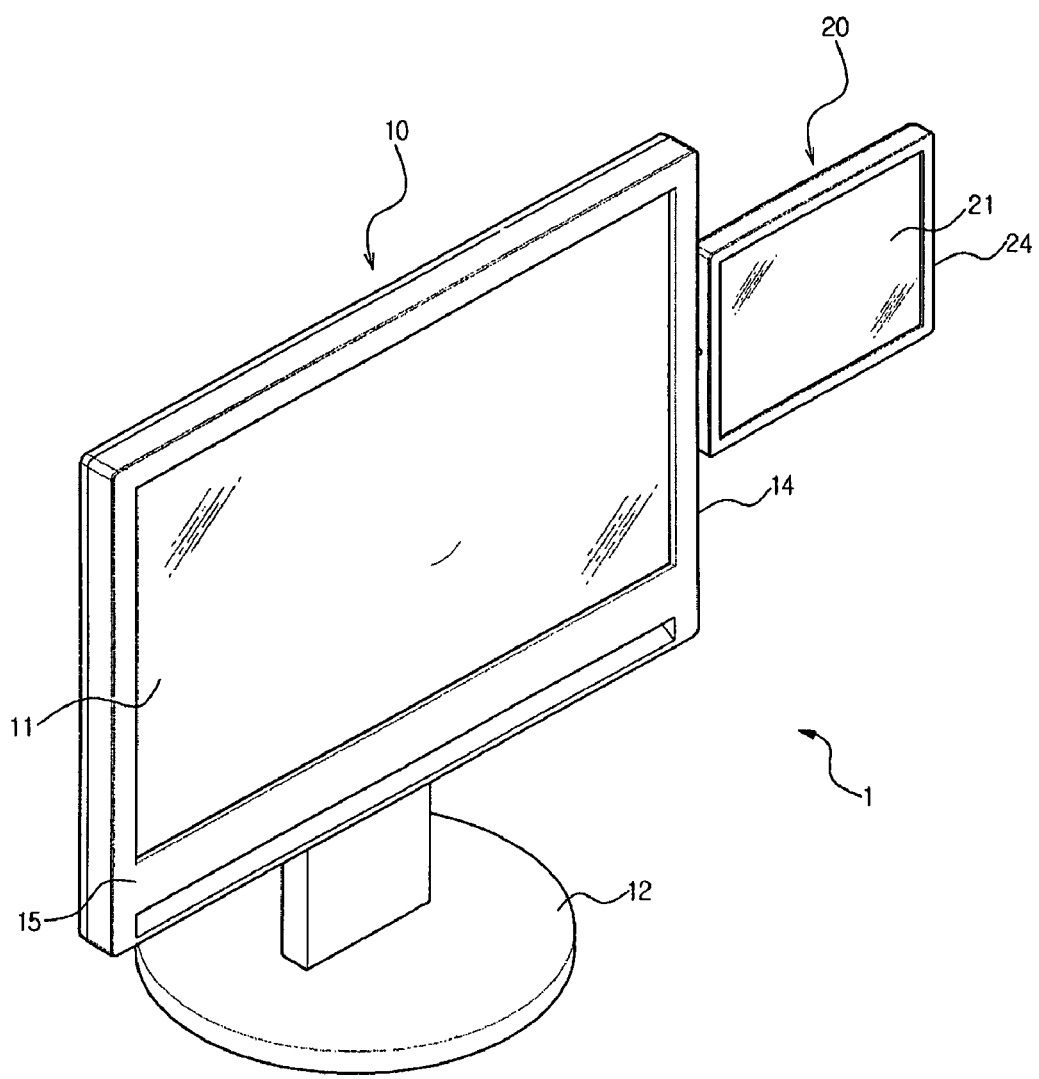
FIG. 1 illustrates a perspective view showing a front surface of a dual display unit according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Hereinafter, an embodiment of the present general inventive concept will be described in detail with reference to the accompanying drawings.

FIG. 1 illustrates a perspective view showing a front surface of a dual display unit 1 having a supporting device 100 (see FIG. 2) according to the present general inventive concept.

The dual display unit includes a main display unit 10 and an auxiliary display unit 20. The auxiliary display unit 20 is installed on a side surface 14 of the main display unit 10.

A stand 12 is installed at a lower portion of the main display unit 10 to support the main display unit 10 on a desk or table (not illustrated) such that the main display unit 10 faces a user (not illustrated). The stand 12 not only simply supports the main display unit 10, but also controls various poses, for example, a lateral pivoting operation and a vertical tilting operation, of the main display unit 10.

Main screen 11 and auxiliary screen 21 are disposed on a main front surface 15 of the main display unit 10 and an auxiliary front surface 24 of the auxiliary display unit 20, respectively, to display an image. In this case, the screens 11 and 21 may be formed of a liquid crystal display (LCD) or plasma display panel (PDP). The auxiliary screen 21 of the auxiliary display unit 20 may be formed smaller than the main screen 11 of the main display unit 10.

Figure 2:
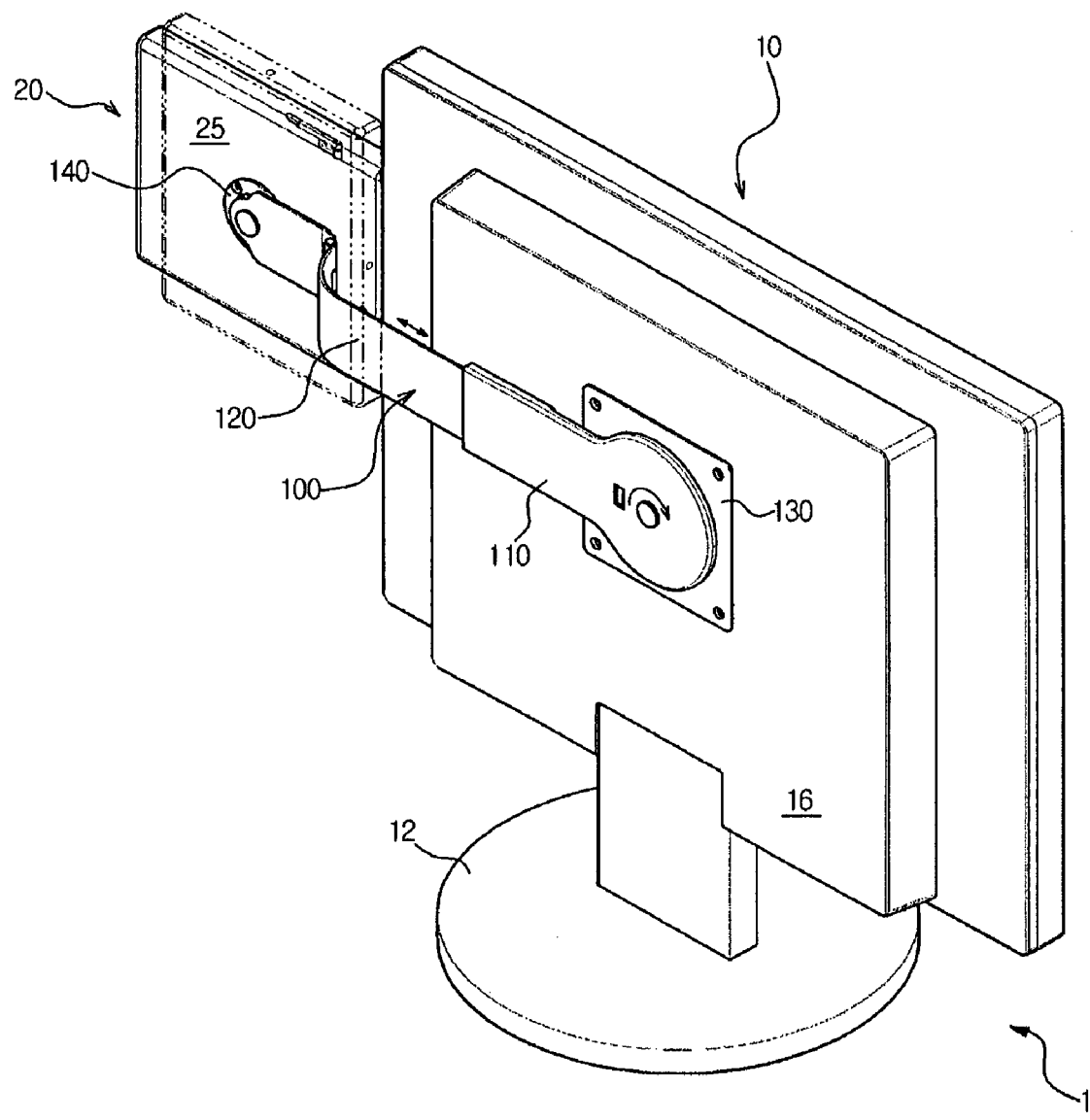
FIG. 2 illustrates a perspective view showing a rear surface of the dual display unit of FIG. 1.

As illustrated in FIG. 2, the supporting device 100 is connected to a main rear surface 16 of the main display unit 10 and an auxiliary rear surface 25 of the auxiliary display unit 20. The supporting device 100 adjusts a distance between the auxiliary display unit 20 and the main display unit 10, and also supports the auxiliary display unit 20 when the pose of the auxiliary display unit 20 is being changed or securely fixed. The supporting device 100 includes a first supporting member 110 installed on the main display unit 10 and a second supporting member 120 installed on the auxiliary display unit 20. The second supporting member 120 is slidably coupled to the first supporting member 110 to adjust the length of the supporting device 100. Accordingly, the distance between the auxiliary display unit 20 and the main display unit 10 can be adjusted by adjusting the extendable length of the supporting device 100.

Further, first and second installation brackets 130 and 140 are fixed to the main display unit 10 and the auxiliary display unit 20, respectively, to install the supporting device 100 on the main display unit 10 and the auxiliary display unit 20. The first supporting member 110 and the second supporting member 120 are rotatably coupled to the installation brackets 130 and 140. Accordingly, the auxiliary display unit 20 may not only move to an upper portion or a side portion of the main display unit 10, but may be also arranged in a landscape view or a portrait view by rotating.

Figure 3:
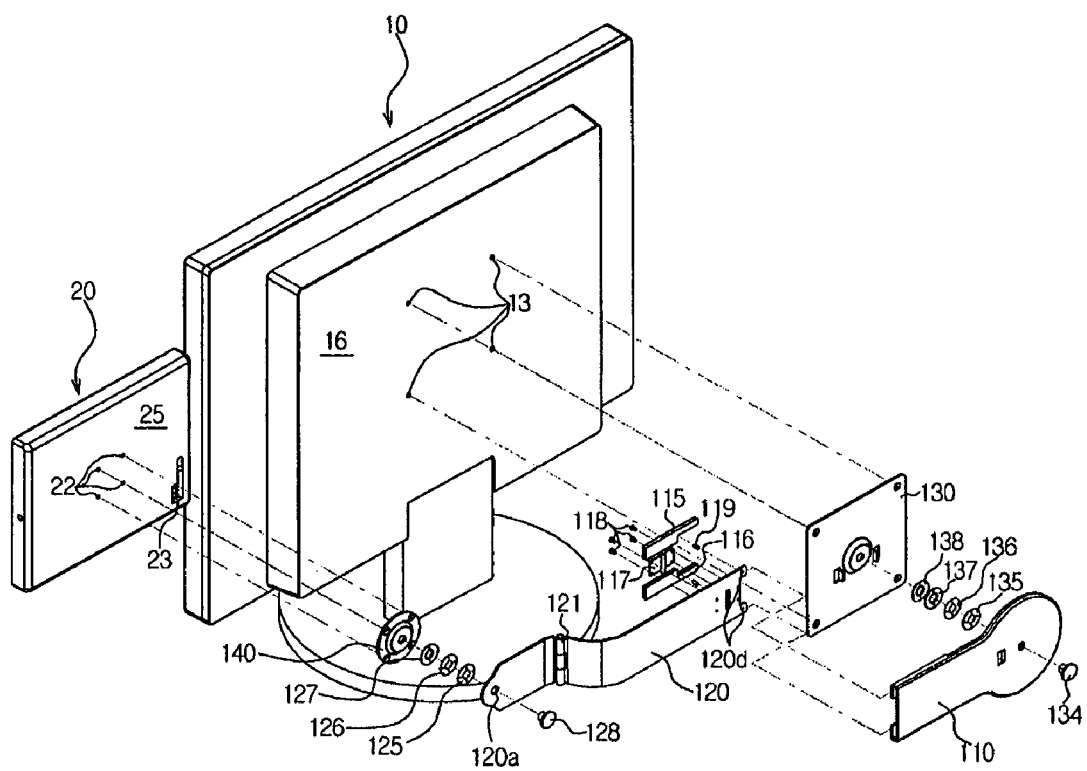
FIG. 3 illustrates an exploded perspective view of the dual display unit.
Figure 4:
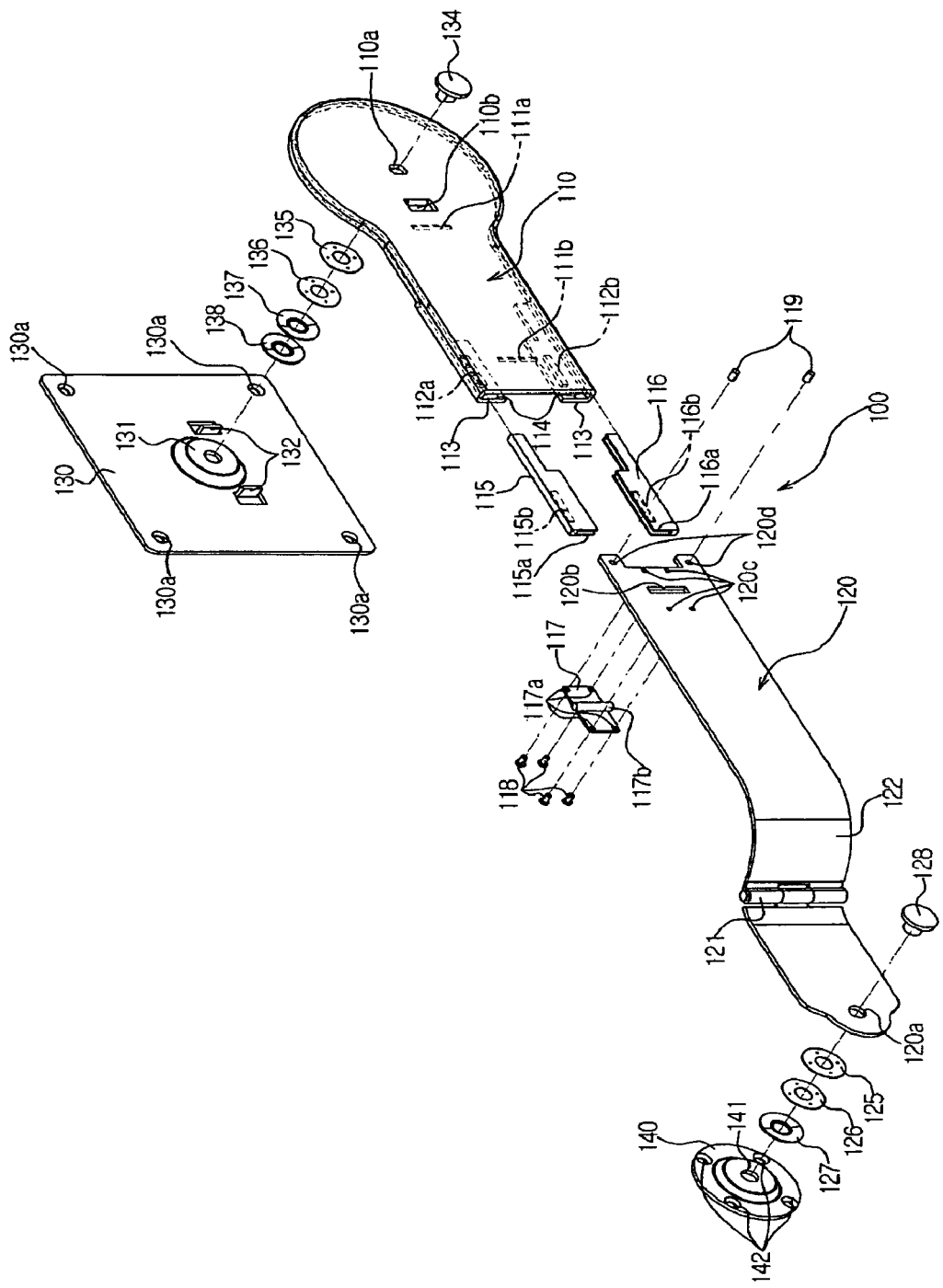
FIG. 4 illustrates an enlarged and exploded perspective view of a supporting device shown in FIG. 3.

Referring to FIGS. 3 and 4, the configuration of the supporting device 100 will be described in detail.

An input unit 23 is disposed on the auxiliary rear surface 25 of the auxiliary display unit 20. The input unit 23 includes an image signal terminal (not illustrated due to scale) to which an image signal transmitted from a computer (not illustrated) or the like is inputted, or a connection terminal for power supply (not illustrated), and the like. The image signal and power may be supplied to the auxiliary display unit 20 through the main display unit 10 or may be independently supplied thereto without passing through the main display unit 10.

Further, the installation brackets 130 and 140 are installed on the main rear surface 16 of the main display unit 10 and the auxiliary rear surface 25 of the auxiliary display unit 20, respectively. Generally, four holes compliant with the VESA standard are arranged in a rectangular shape on the rear surface of a display unit. Main display installation holes 13 and auxiliary display installation holes 22, compliant with the VESA standard, are disposed on the main rear surface 16 of the main display unit 10 and the auxiliary rear surface 25 of the auxiliary display unit 20, respectively. Also, first bracket installation holes 130a and second bracket installation holes 142 are disposed at corresponding positions on the installation brackets 130 and 140. Accordingly, the installation brackets 130 and 140 are fixed to the main display unit 10 and the auxiliary display unit 20 through the first bracket installation holes 130a and second bracket installation holes 142, respectively.

A main bracket shaft hole 130b and an auxiliary bracket shaft hole 140a are disposed on the installation brackets 130 and 140, respectively, for rotation of the first supporting member 110 and the second supporting member 120, respectively. In the central regions including the shaft holes 130b and 140a, protruding portions 131 and 141 are formed on the first installation bracket 130 and the second installation bracket 140, respectively, both protruding in an axial direction relative to main bracket shaft hole 130b and auxiliary bracket shaft hole 140a, to minimize frictional contact during rotation.

Also, a main supporting shaft hole 110a and an auxiliary supporting shaft hole 120a are disposed on the first supporting member 110 and the second supporting member 120, respectively. A first fastening member 134 and a second fastening member 128, which are both formed in a bolt shape, pass through the main supporting shaft hole 110a of the first supporting member 110 and the auxiliary supporting shaft hole 120a of the second supporting member 120, and are coupled to the main bracket shaft hole 130b and the auxiliary bracket shaft hole 140a of the first installation bracket 130 and the second installation bracket 140, respectively.

Four friction rings 135, 136, 137 and 138 are installed between the first supporting member 110 and the first installation bracket 130 such that the first supporting member 110 can rotate at an appropriate velocity. Further, the friction rings 135, 136, 137 and 138 induce the first supporting member 110 to stop whenever the first supporting member 110 is rotated by 90 degrees. In the same way, three friction rings 125, 126 and 127 are installed between the second supporting member 120 and the second installation bracket 140. The function of the friction rings 125, 126 and 127 is the same as that of the friction rings installed on the first supporting member 110.

Meanwhile, first rotation limiting projections 132 are formed on the first installation bracket 130 to restrict a rotation range of the first supporting member 110, and a second rotation limiting projection 110b is installed on the first supporting member 110. The first rotation limiting projections 132 and the second rotation limiting projection 110b are rotation limiting elements to form a contact surface according to the rotational phase of the first supporting member 110. The first rotation limiting projections 132 are disposed at the opposite sides of the main bracket shaft hole 130b of the first installation bracket 130, and the second rotation limiting projection 110b is formed at one side of the main supporting shaft hole 110a. Accordingly, the rotation range of the first supporting member 110 is limited to about 180 degrees. Consequently, the auxiliary display unit 20 can be fixed on the opposite side of the main display unit 10 (i.e. the side opposite side surface 14 of FIG. 1) without moving to a lower portion of the main display unit 10, if desired.

Next, as for a coupling relation between the first supporting member 110 and the second supporting member 120, guide rails 113 are formed at one side of the first supporting member 110 to guide a sliding motion of the second supporting member 120. Guide members 115 and 116 forming contact surfaces with the second supporting member 120 are installed on an inside 114 of each of the respective guide rails 113. The guide rails 113 receive and support the guide members 115 and 116. The guide members 115 and 116 slidably support the second supporting member 120, and also provide an appropriate friction force in the sliding motion of the second supporting member 120 to adjust a moving velocity during extension or retraction.

Fixing protrusions 112a and 112b are disposed on the first supporting member 110 to limit the guide members 115 and 116 in the forward and backward movement of the second supporting member 120, in order to maintain the structural integrity of supporting device 100. Fixing grooves 115a and 116a are disposed on the guide members 115 and 116 at positions corresponding to the fixing protrusions 112a and 112b. In this case, the configuration of the fixing protrusions 112a and 112b and the fixing grooves 115a and 116a can be changed to modify the range of movement of the guide members 115 and 116 relative to the first supporting member 110.

Pin holes 120d (see FIG. 3) are disposed at an end portion opposite to an end portion of the second supporting member 120 on which the auxiliary display unit 20 is installed. In other words, pin holes 120d are disposed near the end of second supporting member 120 closer to first supporting member 110. Anti-separation pins 119 (see FIG. 3) are coupled to the pin holes 120d. In a state where the end portion of the second supporting member 120 passes through the rail portions 115a and 116a of the guide members 115 and 116 and moves to the opposite side, the anti-separation pins 119 are coupled to the pin holes 120d. Accordingly, when the second supporting member 120 moves toward the outside in a state where the anti-separation pins 119 are coupled to the pin holes 120d, if the second supporting member 120 moves out of the set moving range, the anti-separation pins 119 are stopped by ends of the rail portions 115a and 116a and no more movement is possible, thereby preventing separation.

The first supporting member 110 includes position determining grooves 111a and 111b to establish a stop position in the sliding motion of the second supporting member 120. A stopper 117 having a position determining protrusion 117b, which is adapted to engage with the position determining grooves 111a and 111b, is installed on the second supporting member 120.

The stopper 117 can be fixed to the second supporting member 120 by coupling fastening members 118 to stopper installation holes 117a and second support installation holes 120c disposed on the stopper 117 and the second supporting member 120, respectively. In a state where the second supporting member 120 is coupled to the first supporting member 110, the stopper 117 is fixed to the second supporting member 120. A through hole 120b is disposed on the second supporting member 120 such that the position determining protrusion 117b passes through the through hole 120b to be protruded to the opposite side. The position determining protrusion 117b is disposed at the center of the plate-shaped stopper 117 and is elastically supported by the shape of the stopper 117.

A pair of the position determining grooves 111a and 111b can be disposed on the inner surface of the first supporting member 110 to be spaced from each other by a specific distance. In a state where the auxiliary display unit 20 is placed at the upper side or opposite sides of the main display unit 10, the position determining grooves 111a and 111b are disposed at two positions of the position determining protrusion 117b on the inner surface of the first supporting member 110. Accordingly, when the auxiliary display unit 20 is placed at the upper side or opposite side of the main display unit 10 in the movement of the auxiliary display unit 20, the position determining protrusion 117b is either coupled to the position determining grooves 111a or the position determining grooves 111b to securely fix the length of the supporting device 100.

Further, a hinge portion 121 is disposed on the second supporting member 120 such that the screen of the auxiliary display unit 20 can be rotated and tilted while forming a specific inclination angle with the screen of the main display unit 10. In this case, it is preferable that the hinge portion 121 is positioned inwardly from an outer boundary of the auxiliary display unit 20 in a state where the second supporting member 120 is installed on the auxiliary display unit 20.

Further, a bent portion 122 is formed on the second supporting member 120 to be bent forward from the main display unit 10 when the supporting device 100 is installed. The bent portion 122 allows the auxiliary display unit 20 to be positioned on the same plane as the main display unit 10 taking into consideration that there is a difference between the thicknesses of the main display unit 10 and auxiliary display unit 20.

Figure 5:
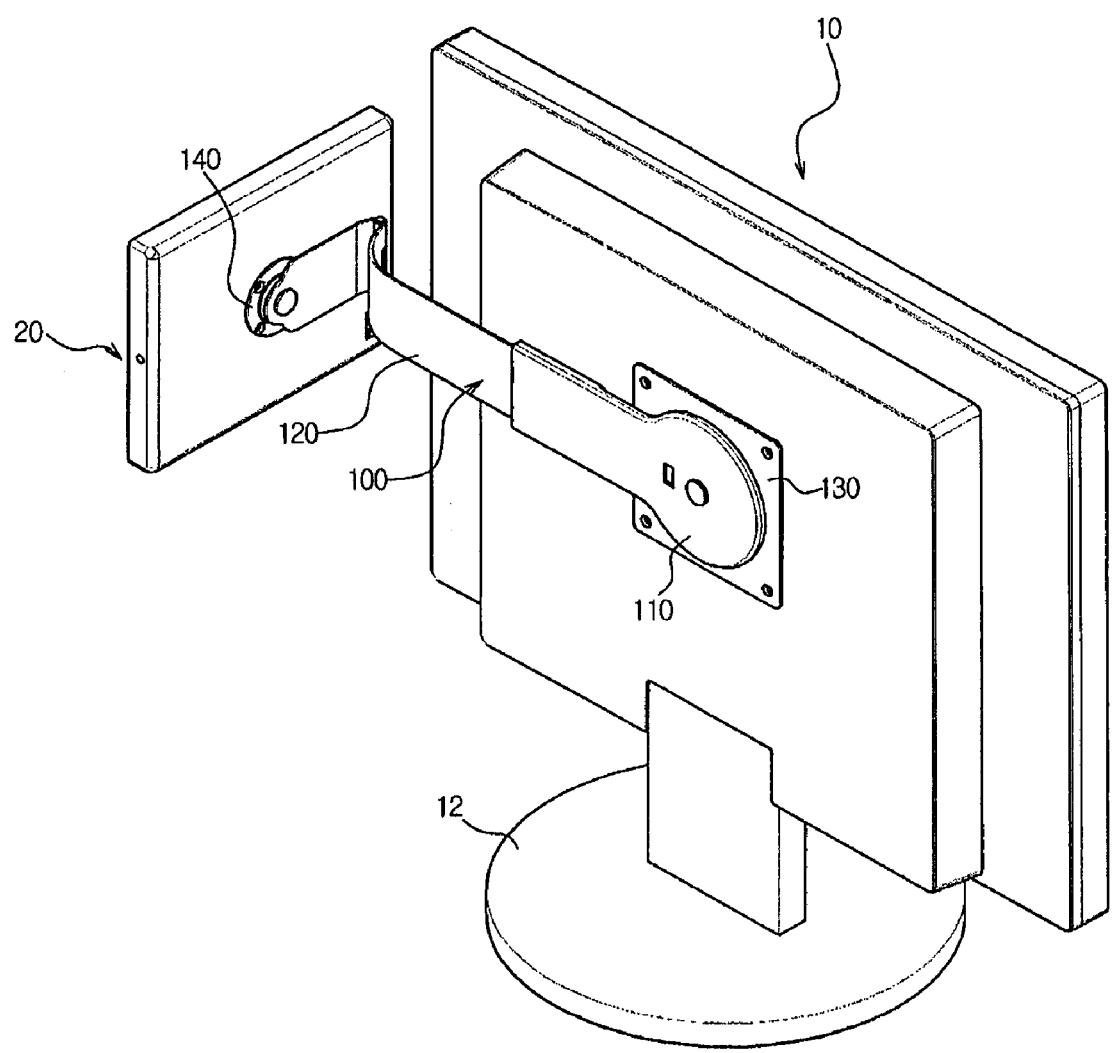
FIG. 5 illustrates a use state in which an auxiliary display unit is tilted.

Through the above configuration, as shown in FIG. 5, the auxiliary display unit 20 can be rotated by the hinge portion 121 to perform a tilting operation such that its front surface 24 faces toward the side so that the auxiliary display unit 20 and the main display unit 10 are arranged at 90 degrees.

Figure 6:
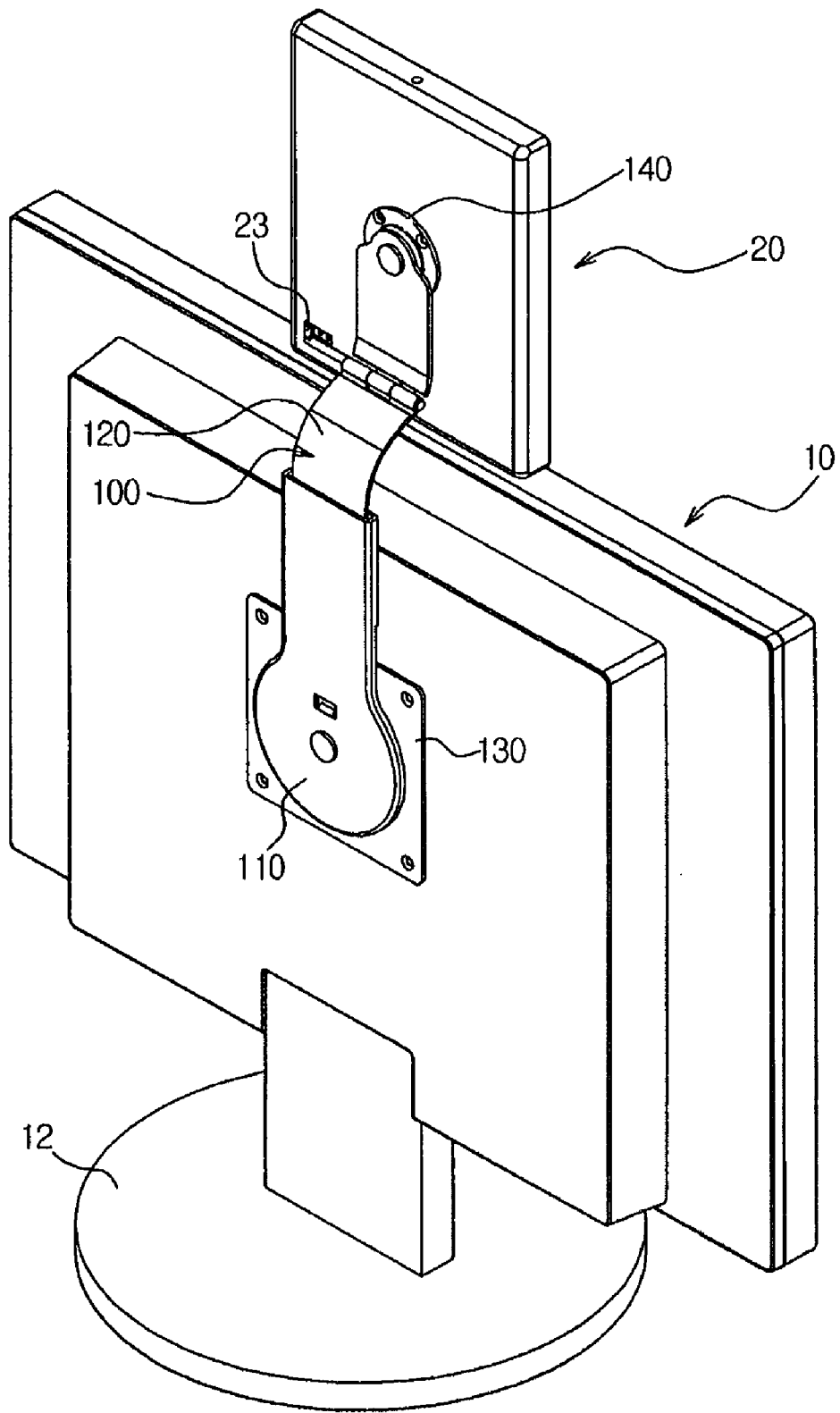
FIG. 6 illustrates a use state in which the auxiliary display unit is positioned at an upper portion of a main display unit.

Further, when the supporting device 100 is rotated upward as shown in FIG. 6, the auxiliary display unit 20 can be positioned at the upper side of the main display unit 10. Also in this case, the auxiliary display unit 20 can be arranged in a landscape view or a portrait view by rotating.

The auxiliary display unit 20 can be easily separated from the supporting device 100 and used as an independent display unit after separation.

Figure 7:
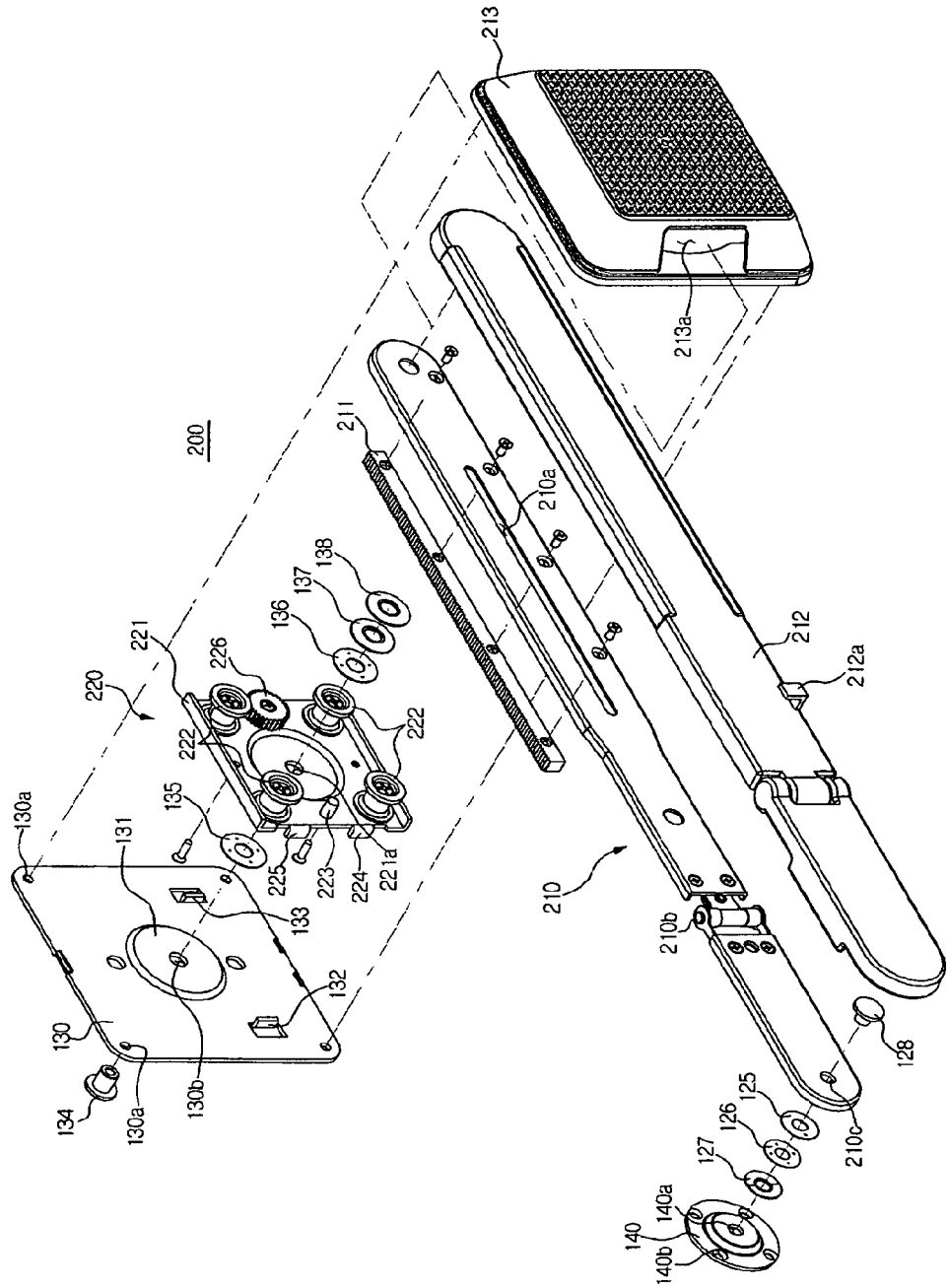
FIG. 7 illustrates an exploded perspective view of a supporting device according to another embodiment of the present general inventive concept.

FIG. 7 illustrates an exploded perspective view of a supporting device 200 according to another embodiment of the present general inventive concept.

The supporting device 200 includes a supporting member 210 which connects between the main display unit 10 (see FIG. 3) and the auxiliary display unit 20 (see FIG. 3), and a slide unit 220 which is slidably coupled to the supporting member 210 and guides the forward and backward movement of the supporting member 210 to adjust a distance between the auxiliary display unit 20 and main display unit 10.

One end of the supporting member 210 is rotatably coupled to the rear surface 25 of the auxiliary display unit 20 in the same way as in the above embodiment. However, although two supporting members 110 and 120 are slidably coupled to each other to adjust the length in the above embodiment, it is a design choice whether to configure for the capability to adjust the length of the supporting member 210 in this embodiment. Alternately, it is possible to adjust a distance between the main display unit 10 and auxiliary display unit 20 through a sliding motion with the slide unit 220 coupled to the rear surface 16 of the main display unit 10.

The slide unit 220 includes a rotation plate 221 forming a base and guide rollers 222 installed on the rotation plate 221.

The rotation plate 221 is rotatably coupled to the main display unit 10. For this, a shaft hole 221*a* is disposed at the center of the rotation plate 221.

In the same way as in the above embodiment, the first installation bracket 130 is installed on the main display unit 10 through the first bracket installation holes 130*a* compliant with the VESA standard. The shaft hole 130*b* and the protruding portion 131 are also formed on the installation bracket 130.

The fastening member 134 is coupled back and forth between the installation bracket 130 and the rotation plate 221 through the shaft holes 130*b* and 221*a*. The friction rings 135 and 136 and washers 137 and 138 are interposed between the fastening member 134 and the rotation plate 221.

Further, the first rotation limiting projections 132 and 133 are formed on the installation bracket 130, and two second rotation limiting projections 224 and 225 are formed at one side of the rotation plate 221.

The first rotation limiting projections 132 and 133 are arranged at a central angle of about 180 degrees with respect to the shaft hole. The second rotation limiting projections 224 and 225 are disposed on one surface of the rotation plate 221 to be spaced from each other. Accordingly, when the supporting member 210 faces to the left side as shown in FIG. 7, the first rotation limiting projection 132 of the left side is in contact with the second rotation limiting projection 224 positioned at a lower portion to restrict the rotation of the slide unit 220. On the other hand, when the supporting member 210 faces to the right side, the first rotation limiting projection 133 of the right side is in contact with the other second rotation limiting projection 225 to restrict rotation. Accordingly, the auxiliary display unit 20 can maintain a fixed state while being positioned at the opposite side of the main display unit 10.

The guide rollers 222 installed on the rotation plate 221 can be arranged in a rectangular shape, as illustrated. Two guide rollers 222 arranged at the upper side of the rotation plate 221 support an upper portion of the supporting member 210, and two guide rollers 222 arranged at the lower side of the rotation plate 221 support a lower portion of the supporting member 210, thereby guiding the forward and backward movement of the supporting member 210 in a longitudinal direction.

A guide groove 210*a* is formed on the supporting member 210 in the longitudinal direction, and a slide protrusion 223 which is coupled to the guide groove 210*a* is formed on the rotation plate 221. The guide groove 210*a* restricts a moving range of the supporting member 210. When the supporting member 210 moves back and forth along the guide rollers 222, the slide protrusion 223 moves within the guide groove 210*a* while registered therein. Then, when the slide protrusion 223 comes in contact with the end portion of the guide groove 210*a*, it provides a braking force on the movement of the supporting member 210, stopping movement. Accordingly, the moving range of the supporting member 210 is determined by the length of the guide groove 210*a*.

In this case, the slide protrusion 223 may be formed as a single body with the rotation plate 221 or may be separately processed and assembled from the rotation plate 221.

Further, a rack 211 and a pinion 226 are installed on the supporting member 210 and the rotation plate 221, respectively. The rack 211 is registered for motion in the longitudinal direction of the supporting member 210 in the same way as the guide groove 210*a*. Since the rack 211 is operated within the moving range of the supporting member 210, the length of the rack 211 corresponds to the length of the guide groove 210*a*.

The pinion 226 installed on the rotation plate 221 is engaged with the rack 211 to rotate as the rack 211 moves. In order to keep the pinion 226 from being separated from the rack 211 while the supporting member 210 moves back and forth, the positions of the rack 211 and the pinion 226 are determined with regard to the moving range of the supporting member 210 according to the guide groove 210*a* and the slide protrusion 223. The rack 211 and the pinion 226 are provided to regulate the translational speed of the supporting member 210, by adjusting the rotational resistance of the pinion 226, applied to the linear movement of the rack 211. In this case, the rotational resistance of the pinion 226 may increase by connecting an additional damper (not shown) to the pinion 226 or by coating fluid with high viscosity on a rotation shaft of the pinion 226 to increase rotational friction.

A hinge portion 210*b* is disposed on the supporting member 210 in the same way as in the above embodiment for a tilting operation of the auxiliary display unit 20 in a forward and backward direction. Also, a coupling structure between the supporting member 210 and the auxiliary display unit 20 may be formed in the same way as in the above embodiment. Accordingly, the second installation bracket 140 having the shaft hole 140*a* is coupled to the auxiliary display unit 20. The friction rings 125, 126 and 127 are installed between the second installation bracket 140 and the supporting member 210. The supporting member 210 is rotatably coupled to the auxiliary display unit 20 through the fastening member 128.

The first installation bracket 130 and the second installation bracket 140 are installed in advance on the auxiliary display unit 20 and main display unit 10, respectively, to facilitate the installation of the supporting device 200. However, the installation brackets 130 and 140 are not necessarily used only for installation of the supporting device 200. If the shaft holes 130*b* and 140*a* or the first rotation limiting projections 132 and 133 formed on the installation brackets 130 and 140 are provided on the auxiliary display unit 20 or the main display unit 10, the installation brackets 130 and 140 may be omitted.

Meanwhile, a supporting cover 212 providing protection and an aesthetic appearance, may be installed on the supporting member 210. A slide cover 213 providing protection and an aesthetic appearance may also be coupled to the slide unit 220. Since the slide cover 213 is coupled to the slide unit 220 such that the supporting member 210 passes through the opposite sides thereof, through holes 213*a* are provided at opposite sides of the slide cover 213. A cover fastening bracket 212*a* is used for ease of attachment. See FIG. 9.

Figure 8:
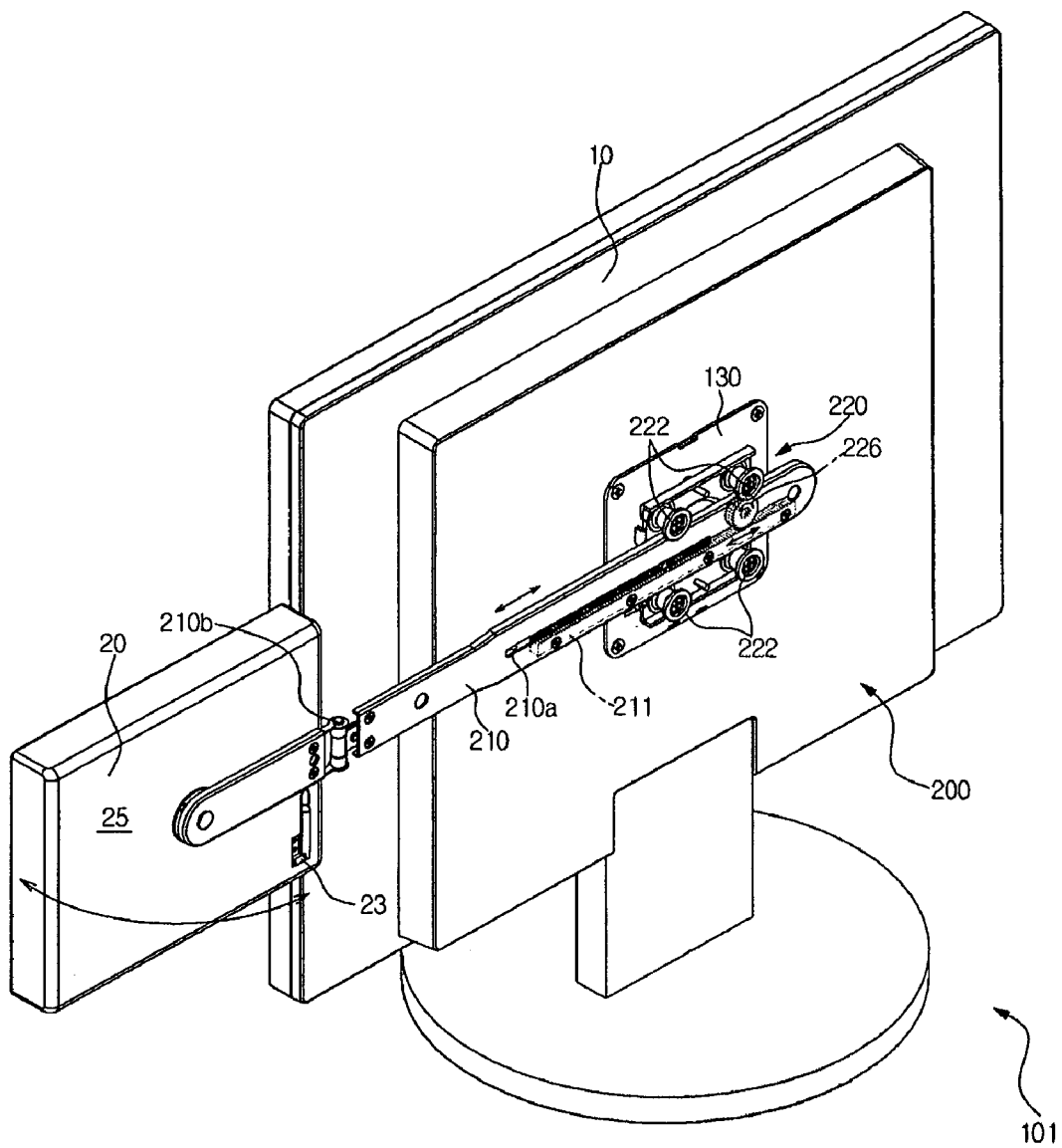
FIG. 8 illustrates a perspective view of a dual monitor with the supporting device shown in FIG. 7.

FIG. 8 illustrates a rear perspective view of another embodiment of a dual display unit 101, showing the supporting device 200 of FIG. 7 assembled and mounted on the main display unit 10 and the auxiliary display unit 20, but without the supporting cover 212 and the slide cover 213, for clarity of illustration. The supporting device 101 differs from the supporting device 1 (see FIG. 2) in having respectively different supporting devices 200 and 100 in these exemplary embodiments.

As described above, the slide unit 220 can rotate within a range of 180 degrees with respect to the main display unit 10. The slide unit 220 supports the supporting member 210 such that the supporting member 210 is movable back and forth while the auxiliary display unit 20 is installed on one end of the supporting member 210. Further, the slide unit 220 prevents the supporting member 210 from being separated in a forward and backward direction.

The slide protrusion 223 (see FIG. 7) is coupled to the guide groove 210a formed on the supporting member 210 such that the moving range of the supporting member 210 is limited to the length of the guide groove 210a. Further, the rack 211 installed on the supporting member 210 is coupled to the pinion 226 installed on the rotation plate 221 to reduce the moving velocity of the supporting member 210, thereby preventing a rapid increase in the velocity of the supporting member 210 when the position of the auxiliary display unit 20 is changed such that the guide groove 210a does not collide with the slide protrusion 223 at an excessive velocity. Accordingly, it is possible to improve ease of operation for the user and to prevent damage of the auxiliary display unit 20 and slide protrusion 223.

The input unit 23 is disposed on the auxiliary rear surface 25 of the auxiliary display unit 20. The input unit 23 includes an image signal input terminal, a power supply terminal, and the like.

Further, in the supporting device 200, a cable holder 231a (see FIG. 9) is disposed on the cover 213 to fix a cable (not shown), which is provided to supply an image signal or power to the auxiliary display unit 20 from the main display unit 10.

Figure 9:
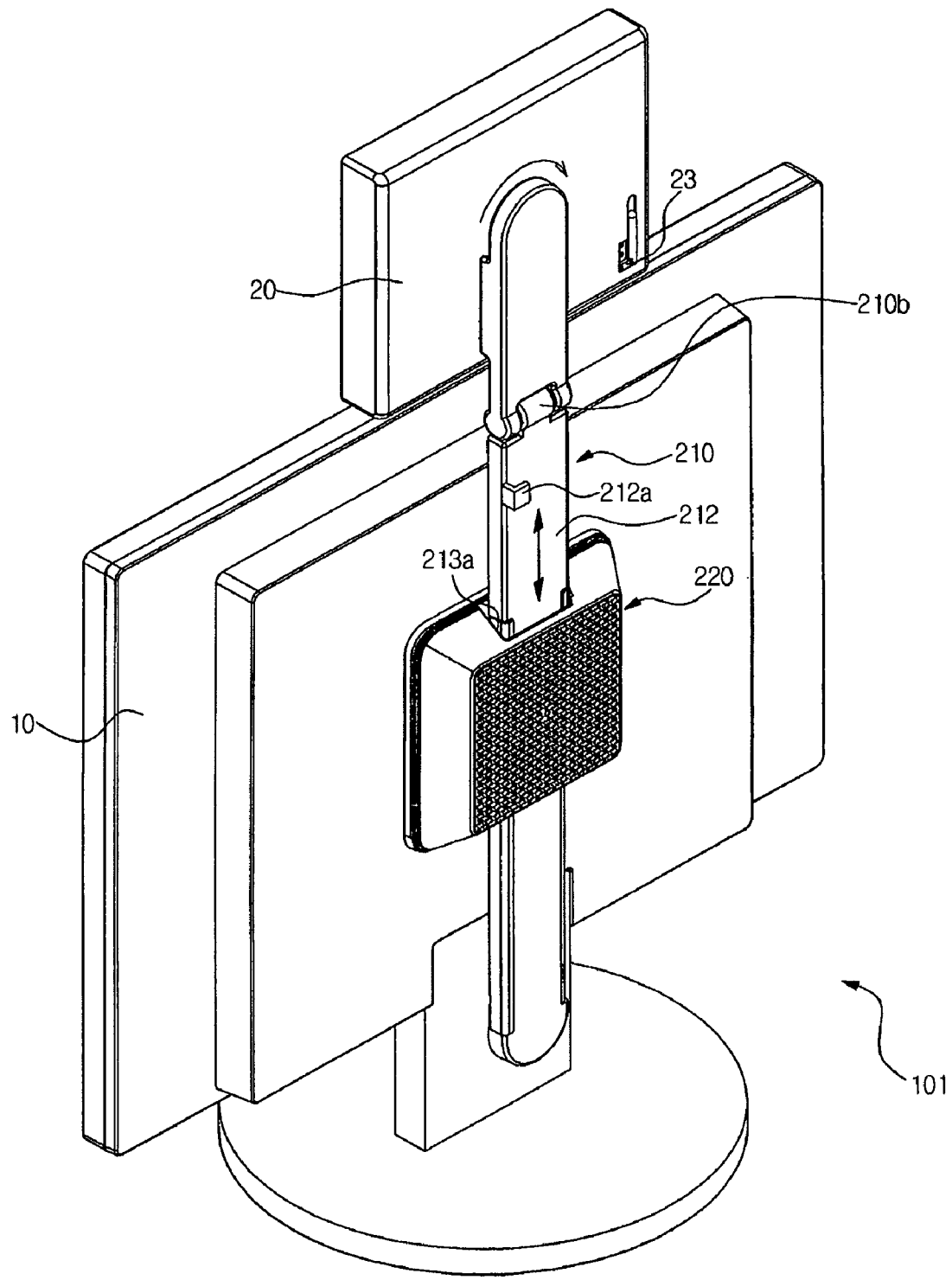
FIG. 9 illustrates a use state in which the auxiliary display unit is positioned at an upper portion of the main display unit by the supporting device shown in FIG. 7.

FIG. 9 illustrates a perspective view showing a state where the auxiliary display unit 20 is positioned at an upper portion of the main display unit 10 by the supporting device 200.

As illustrated in FIG. 9, when the auxiliary display unit 20 is positioned at the upper portion of the main display unit 10, the distance between auxiliary display unit 20 and main display unit 10 is reduced compared to a state where the auxiliary display unit 20 is positioned at one side of the main display unit 10 as shown in FIG. 8, due to the rectangular outline of main display unit 10. In this case, as the distance is reduced, a portion of the supporting member 210 which is not used to support the auxiliary display unit 20 is passed through the slide unit 220 downward in order to achieve the configuration illustrated in FIG. 9.

In this embodiment, in the same way as in the above embodiment, the auxiliary display unit 20 may rotate with respect to the supporting device 200 to be arranged in a landscape view or a portrait view. In other words, the auxiliary display unit 20 may perform a tilting operation in a forward and backward direction by the hinge portion 210b of the supporting member 210.

Further, although the slide unit 220 is installed on the main display unit 10 in the illustrated embodiment, also in a case where the slide unit 220 is installed on the auxiliary display unit 20, it is possible to adjust the distance between the auxiliary display unit 20 and main display unit 10.

Although embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. A dual display unit comprising:
   a stand;
   a main display unit non-rotatably fixed to the stand to display an image;
   a supporting device which is rotatably coupled to a rear surface of the main display unit; and
   an electronic auxiliary display unit which is installed on the supporting device,
   wherein the supporting device is configured to adjust a distance between the main display unit and the auxiliary display unit,
   wherein the supporting device is rotatably installed such that the auxiliary display unit moves to an upper side and opposite side of the main display unit.

2. The dual display unit according to claim 1, wherein the supporting device is rotatably coupled to the auxiliary display unit such that the auxiliary display unit is capable of being arranged in a landscape view or a portrait view.

3. The dual display unit according to claim 1, wherein the supporting device includes a first supporting member installed on the main display unit and a second supporting member installed on the auxiliary display unit, and the first supporting member and the second supporting member are slidably coupled to each other to adjust the distance between the main display unit and the auxiliary display unit.

4. The dual display unit according to claim 3, wherein the first supporting member includes a guide rail to guide a sliding motion of the second supporting member.

5. The dual display unit according to claim 4, wherein a guide member is installed on an inside of the guide rail to guide the sliding motion of the second supporting member.

6. The dual display unit according to claim 5, wherein at least one fixing protrusion is disposed on any one of the inside of the guide rail, the guide member or a fixing groove coupled to the fixing protrusion, is disposed on the other thereof to fix a position of the guide member.

7. The dual display unit according to claim 5, wherein the first supporting member includes a position determining groove to guide a sliding position of the second supporting member, and a stopper having a position determining protrusion, which is engaged with the position determining groove, is installed on the second supporting member.

8. The dual display unit according to claim 3, wherein the second supporting member includes a hinge portion such that the auxiliary display unit can be tilted forward and backward.

9. The dual display unit according to claim 1, wherein an installation hole compliant with a VESA standard is disposed on a rear surface of the main display unit, and the supporting device is installed through the installation hole.

10. The dual display unit according to claim 9, wherein an installation bracket is coupled to the rear surface of the main display unit through the installation hole, and the installation bracket includes a shaft hole to support the supporting device to rotate with respect to the main display unit.

11. The dual display unit according to claim 10, wherein the installation bracket includes first rotation limiting projections formed at opposite sides of the shaft hole, and the supporting device includes a second rotation limiting projection which is in contact with the first rotation limiting projections to restrict a rotation range of the supporting device.

12. The dual display unit according to claim 1, wherein the supporting device includes a supporting member which connects between the main display unit and auxiliary display unit, and a slide unit which is installed on the main display unit or the auxiliary display unit and guides forward and backward movement of the supporting member to adjust the distance between the main display unit and auxiliary display unit.

13. The dual display unit according to claim 12, wherein the slide unit is rotatably coupled to main display unit or the auxiliary display unit.

14. The dual display unit according to claim 13, wherein the supporting member is rotatably coupled to the main display unit or the auxiliary display unit.

15. The dual display unit according to claim 12, wherein the supporting member includes a hinge portion such that the auxiliary display unit can be tilted forward and backward.

16. The dual display unit according to claim 12, wherein the main display unit includes at least one first rotation limiting projection formed on its rear surface, and the supporting device includes a second rotation limiting projection which is in contact with the first rotation limiting projection to restrict a rotation range of the supporting device.

17. A dual display unit comprising:
  a first display unit;
  an electronic second display unit;
  a stand non-rotatably fixed to the first display unit; and
  a supporting device rotatably coupled to a rear surface of the first display unit and the second display unit, the supporting device being capable of providing a range of motion to reposition at least one of the display units such that the viewing configuration is changed as either the first display unit or the second display unit is repositioned along the range of motion of the supporting device, wherein the supporting device is rotatably installed such that the second display moves to an upper side and opposite side of the first display unit.

* * * * *